United States Patent [19]
Lehner et al.

[11] Patent Number: 5,984,830
[45] Date of Patent: Nov. 16, 1999

[54] APPARATUS AND METHOD FOR SHIFTING INTO A LOWER GEAR OF A MANUAL TRANSMISSION

[75] Inventors: Steven E. Lehner; Mark E. Rettig, both of Peoria, Ill.

[73] Assignee: Caterpillar Inc., Peoria, Ill.

[21] Appl. No.: 09/199,939

[22] Filed: Nov. 25, 1998

Related U.S. Application Data

[63] Continuation of application No. 08/887,573, Jul. 3, 1997.

[51] Int. Cl.$^6$ .................................................. B60K 41/04
[52] U.S. Cl. ............................................ 477/109; 477/107
[58] Field of Search ................................ 74/335, 336 R; 477/107, 109; 701/64

[56] References Cited

U.S. PATENT DOCUMENTS

| | | | |
|---|---|---|---|
| 4,411,174 | 10/1983 | Yokoi et al. | 477/908 X |
| 4,703,304 | 10/1987 | Muguruma et al. | 477/107 X |
| 4,853,673 | 8/1989 | Kido et al. | 701/64 X |
| 5,030,179 | 7/1991 | Ganoung | 74/333 X |
| 5,305,213 | 4/1994 | Boardman et al. | 477/109 X |
| 5,393,276 | 2/1995 | White et al. | 477/107 X |
| 5,562,567 | 10/1996 | Koenig et al. | 477/109 X |
| 5,573,477 | 11/1996 | Desautels et al. | 477/109 |
| 5,591,102 | 1/1997 | White et al. | 477/107 |
| 5,595,551 | 1/1997 | Hedstrom et al. | 477/109 |

*Primary Examiner*—Dirk Wright
*Assistant Examiner*—Peter T. Kwon

[57] ABSTRACT

A method and apparatus for controllably shifting into a lower gear of a manual transmission is disclosed. A maximum downshift limit value is established and stored in a memory. The downshift speed variable of the manual transmission is set equal to the maximum downshift limit value in response to a valid control condition being determined. The manual transmission is controllably shifted into a lower gear when the engine speed is less than or equal to the downshift speed variable.

39 Claims, 2 Drawing Sheets

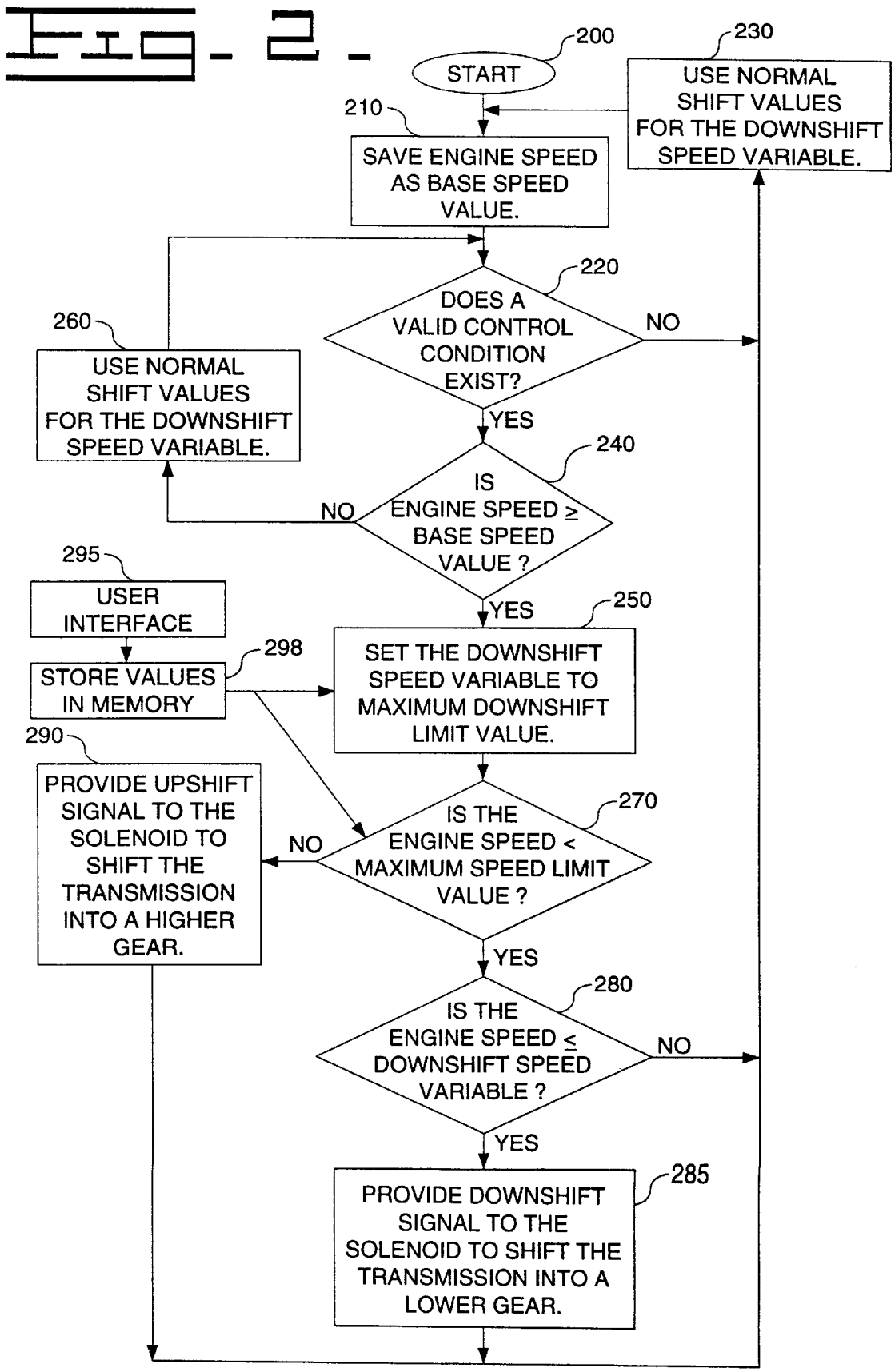

APPARATUS AND METHOD FOR SHIFTING INTO A LOWER GEAR OF A MANUAL TRANSMISSION

CROSS-REFERENCE TO RELATED APPLICATIONS

This application is a continuation of co-pending application Ser. No. 08/887,573, filed Jul. 3, 1997.

TECHNICAL FIELD

This invention relates generally to a method and apparatus for shifting into a lower gear of a manual transmission, and more particularly, to controllably downshifting a manual transmission.

BACKGROUND ART

On-highway trucks having manual transmissions are often used to move payloads over long distances. The manual transmissions used in on-highway trucks can have any number of gears and typically have 10,13 or 18 gears or speeds. Generally, a stick shift is used in automobiles to change between gears of a five speed manual transmission by moving the stick shift to a position corresponding to the desired gear. However, with so many more gears used in on-highway trucks, it is common for a single stick position to be used for more than one gear.

Conventionally, a shuttle switch and/or a range switch is often used to shift between gears sharing the same stick shift position. For example, on a manual transmission having ten gears and a shuttle switch, the stick shift only moves through five positions in order to downshift from the tenth gear through all of the gears to the first gear. When the transmission is in tenth gear, the operator downshifts into ninth gear while the engine is below the downshift speed by operating the shuttle switch. To downshift into eighth gear while currently in ninth gear, the driver shifts into eighth gear by moving the stick shift into the corresponding position when the engine speed is below the downshift speed. This pattern generally continues until the driver moves the stick shift into the first position and operates the shuttle switch to shift into first gear.

Currently, traffic disturbances are often due to a driver failing to operate the truck at a slow and safe speed. Often, operation of the truck at speeds above those desired is due to a driver failing to properly brake and slow down the truck. Most notably, this situation occurs when a truck is driven down a hill and the driver is concerned with excessive wear or overheating of the conventional brakes on the truck.

Conventionally, there have been methods and apparatus, commonly known as "Jake Brakes" available from Jacobs Vehicle Equipment Company of Bloomfield, Connecticut, for loading an engine by opening the exhaust valve on the compression strokes of the engine and using the drag of the engine to assist in braking the truck. However, these systems require additional specialized equipment, can potentially cause problems if not set properly and are expensive to use, operate and maintain.

Currently, the truck driver must ensure that the truck is properly operated to prevent traffic disturbances. In the normal operation of a truck, many events are occurring simultaneously. This increases the potential for driver error, including the risk of incorrectly operating the truck by not driving at a slow and safe speed.

The present invention is directed to overcoming one or more of the problems as set forth above.

DISCLOSURE OF THE INVENTION

In one aspect of the present invention, an apparatus for controllably shifting into a lower gear of a manual transmission is provided. The manual transmission has a downshift speed variable and is coupled to an engine having an engine speed. The apparatus includes a memory, a secondary shift mechanism and a controller. The memory is adapted to store a maximum downshift limit value. The secondary shift mechanism is adapted to provide a control signal to the controller. The controller is in communication with the memory and is adapted to receive a control signal. The controller is also adapted to establish a base speed value. Once the engine speed becomes greater than or equal to the base speed value, the controller is adapted to set the downshift speed variable equal to the maximum downshift limit value. Further, the controller is adapted to controllably shift the manual transmission into a lower gear when the engine speed is less than or equal to the downshift speed variable.

In another aspect of the present invention, a method for controllably shifting into a lower gear of a manual transmission is provided. The manual transmission has a downshift speed variable and a secondary shift mechanism. Further, the manual transmission is coupled to an engine having an engine speed. A maximum downshift limit value is established. A valid control condition and a base speed value are determined. A downshift speed variable is set equal to the maximum downshift limit value in response to the engine speed being greater than the base speed value. Further, the manual transmission is controllably shifted into a lower gear in response to the engine speed being less than or equal to the downshift speed variable.

In another aspect of the present invention, a method for controllably shifting into a lower gear of a manual transmission is provided. The manual transmission has a downshift speed variable and is coupled to an engine having an engine speed. A maximum downshift limit value is established and a control signal is sensed. A valid control condition is determined in response to the control signal. Also, a base speed value is determined. Further, the downshift speed variable is set equal to the maximum downshift limit value in response to the engine speed being greater than the base speed value. Additionally, the manual transmission is shifted into a lower gear when the engine speed is equal to or less than the downshift speed variable.

These and other aspects and advantages of the present invention will become apparent to those skilled in the art upon reading the detailed description of the best mode for carrying out the invention in connection with the drawings and appended claims.

BRIEF DESCRIPTION OF THE DRAWINGS

For a better understanding of the invention, reference may be made to the accompanying drawings, in which:

FIG. 2 is a flow chart illustrating software used in connection with a preferred embodiment of the present invention.

BEST MODE FOR CARRYING OUT THE INVENTION

Figure 1:
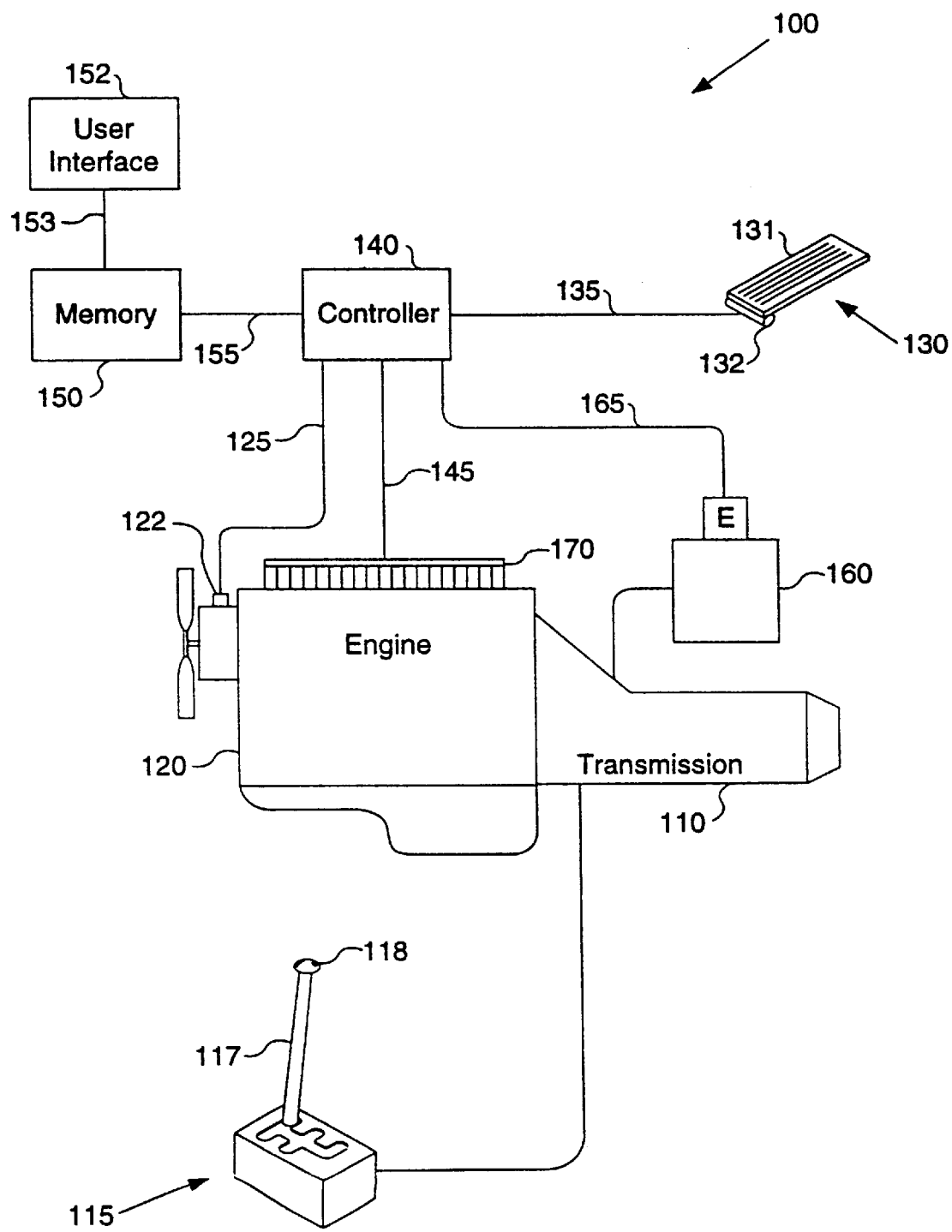
FIG. 1 is a schematic diagram of a preferred embodiment of the present invention.

A preferred embodiment of the present invention provides an apparatus 100 and a method for controllably shifting into a lower gear (not shown) of a manual transmission 110. In FIG. 1, a manual transmission 110 coupled to an engine 120 is shown. The manual transmission 110 has a plurality of gears (not shown), a primary shift mechanism 115, preferably a stick shift 117 having a shuttle switch 118, and a downshift speed variable. Preferably, an engine speed sensor 122 is associated with the engine 120 and produces an engine speed signal representative of the engine speed, preferably provided to a controller 140 over a first electrical connector 125. Because the vehicle speed and transmission speed are proportional to the engine speed when the manual transmission 110 is in a gear, the term "engine speed" as used herein includes transmission speed, vehicle speed or preferably engine speed. The controller 140 is in communication with a memory 150, preferably over a second electrical connector 155.

The memory 150 stores a maximum downshift limit value, and preferably a maximum speed limit value. The maximum downshift limit value is stored in the memory 150 and represents the maximum speed at which the controller 140 controllably downshifts the manual transmission 110 into a lower gear. Advantageously, the maximum downshift limit value is 1550 RPM for a manual transmission 110 having ten speeds or gears. However, other values can be readily and easily used for the maximum downshift limit value without deviating from the scope of the present invention as defined by the appended claims.

In a specific embodiment, the maximum speed limit value represents a maximum speed at which the controller 140 controllably upshifts the manual transmission 110 into a higher gear (not shown) if the engine speed becomes greater than or equal to the maximum speed limit value.

In a specific embodiment of the present invention, a user interface 152 is used to provide the maximum downshift limit value and the maximum speed limit value to the memory 150 over a sixth electrical connector 153.

A secondary shift mechanism 130 is also shown in FIG. 1. The term "secondary shift mechanism" 130 as used herein includes a pushbutton, a switch, a keypad, a console, a computer, a LCD display, pedals, levers, arms, other input devices readily known in the art or preferably, a fuel pedal 131. The secondary shift mechanism 130 provides a control signal, preferably over a third electrical connector 135.

In a preferred embodiment of the present invention, the fuel pedal 131 provides a desired engine speed signal corresponding to the movement of the fuel pedal 131 and the control signal is the desired engine speed signal being substantially a zero throttle value. Further, the fuel pedal 131 has a pulse width modulating sensor 132 that provides the desired engine speed signal to the controller 140 as a function of the movement of the fuel pedal 131. The pulse width modulating sensor 132 could be one of many pulse width modulating sensors readily known in the art, but is preferably a rotary displacement sensor.

The controller 140 is adapted to receive the control signal and determine a valid control condition. In a specific embodiment of the present invention, the controller establishes a fueling condition corresponding to the movement of the secondary shift mechanism 130 and determines that a valid control condition exists in response to the fueling condition being substantially an idle fueling condition. In a specific embodiment of the present invention, the controller determines a valid control condition exists in response to the fueling condition being substantially a zero fueling condition. Advantageously, the engine 120 has fuel injectors 170 having an injector duration preferably provided over fifth electrical connector 145 and the fueling condition is the injector duration. The term "injector duration" as used herein includes the time period which fuel is dispensed into the cylinder of the engine 120 by a fuel valve, carburetor, other device readily known in the art or preferably a fuel injector. However, in the preferred embodiment of the present invention, the controller 140 is adapted to receive the desired engine speed signal from the pulse width modulating sensor 132 of the fuel pedal 131 and determines that a valid control condition exists in response to the desired engine speed signal being substantially a zero throttle value.

The controller 140 is adapted to establish a base speed value. Preferably, the base speed value is continually being saved as long as a valid control condition does not exist. Advantageously, the base speed value is greater than the engine speed and is preferably 150 RPM greater than the engine speed at the time the base speed value is saved. However, in a specific embodiment of the present invention, the base speed value could be changed to a lower value during a valid control condition. This could be advantageous where the engine speed slows down during a valid control condition and would cause the manual transmission 110 to downshift more quickly and at a lower RPM.

Once a valid control condition is determined and the engine speed is greater than or equal to the base speed value, the controller 140 sets the downshift speed variable equal to the maximum downshift limit value. Further, the controller 140 is adapted to controllably shift the manual transmission 110 into a lower gear when the engine speed is less than or equal to the downshift speed variable. Preferably, the manual transmission 110 has a top gear (not shown) and the controller 140 is adapted to determine whether the manual transmission 110 is in the top gear before controllably shifting the manual transmission 110 into a lower gear. Preferably, the controller 140 uses the engine speed to the transmission speed ratio to determine whether the manual transmission 110 is in the top gear. Further, in a preferred embodiment of the present invention, at least one solenoid 160 is responsive to the controller 140 preferably over fourth electrical connector 165 and is adapted to shift the manual transmission 110 into a lower gear.

In a preferred embodiment of the present invention, the transmission 110 has higher gears and the controller 140 is adapted to determine whether the engine speed is greater than or equal to the maximum speed limit value. Once the controller 140 has determined that the engine speed is greater than or equal to the maximum speed limit value, at least one solenoid 160 is responsive to the controller 140 and adapted to shift the manual transmission 110 into a higher gear in response to the controller 140.

In a specific embodiment of the present invention, the secondary shift mechanism 130 is a switch or preferably a pushbutton (not shown). The pushbutton is adapted to provide to the controller 140 a control signal. The controller 140 is adapted to receive the control signal provided by the pushbutton and determine a valid control condition in response to the control signal. The controller 140 sets the downshift speed variable equal to the maximum downshift limit value in response to determining a valid control condition and controllably shifts the manual transmission 110 into a lower gear when the engine speed is less than or equal to the downshift speed variable.

In a preferred embodiment, the controller 140 is a 68HC11 microcontroller manufactured by Motorola located in Schaumburg, Illinois. However, other suitable microcontrollers are known in the art, any one of which could be readily and easily used in connection with an embodiment of the present invention. A specific program code can be readily and easily written from the flowchart, shown in FIG. 2, in the specific assembly language or microcode for the selected microcontroller.

Now referring to FIG. 2, in a first block 200, program control of a preferred embodiment of the present invention begins. Program control passes to a second block 210.

In the second block 210, the engine speed is saved as the base speed value. Preferably, the base speed value is saved at 150 RPM greater than the engine speed. From the second block 210, program control passes to a first decision block 220.

In the first decision block 220, the controller 140 determines whether a valid control condition exists. In a specific embodiment of the present invention, the control signal is received by the controller 140 and the controller 140 determines from the control signal whether a valid control condition exists. If the controller 140 determines that a valid control condition exists, then program control passes to second decision block 240. Otherwise, program control passes to third block 230.

In second decision block 240, the controller 140 determines whether the engine speed is greater than or equal to the base speed value. If the engine speed is greater than or equal to the base speed value, then program control passes to fourth block 250. Otherwise, program control passes to fifth block 260.

In fifth block 260, the controller 140 reverts back to using normal shift procedures and values including the downshift speed values normally used for driving on a highway. From fifth block 260, program control passes back to first decision block 220.

In fourth block 250, the controller 140 sets the downshift speed variable equal to the maximum downshift limit value stored in memory 150. From fourth block 250, program control passes to third decision block 270.

In third decision block 270, the controller 140 determines whether the engine speed is less than the maximum speed limit value. If the engine speed is less than the maximum speed limit value, then program control passes to fourth decision block 280. Otherwise, program control passes to sixth block 290.

In sixth block 290, the controller 140 provides the upshift signal to the solenoid 160 in order to shift the manual transmission 110 into a higher gear. From sixth block 290, program control passes to third block 230.

In fourth decision block 280, the controller 140 determines whether the engine speed is less than or equal to the downshift speed variable. If the engine speed is less than or equal to the downshift speed variable, then program control passes to seventh block 285. Otherwise, program control passes to third block 230.

In seventh block 285, the controller 140 provides the downshift signal to the solenoid 160 to shift the transmission into a lower gear. From seventh block 285, program control passes to third block 230.

In third block 230, the controller 140 reverts back to using normal shift procedures and values including the normal downshift speed values used for the downshift speed variable for driving on an open highway. Program control then passes to second block 210. In second block 210, the controller 140 saves the engine speed as the base speed value as described above.

In eighth block 295, the user interface 152 provides the maximum downshift limit value and the maximum speed limit value. From eighth block 295, program control passes to ninth block 298. In ninth block 298, the maximum downshift limit value and the maximum speed limit value are stored in the memory 150. The maximum downshift limit value is provided to fourth block 250 and the maximum speed limit value is provided to third decision block 270.

While aspects of the present invention have been particularly shown and described with reference to the preferred embodiment above, it will be understood by those skilled in the art that various additional embodiments may be contemplated without departing from the spirit and scope of the present invention. For example, a method and apparatus 100 of the present invention may have a manual transmission 110 coupled to an electric motor having a motor speed or other type of prime mover instead of an engine. Further, because transmission speed and vehicle speed are proportional to engine speed when the vehicle is in gear, transmission speed and vehicle speed and the appropriate values and variables could be used. However, such devices and methods should be understood to fall within the scope of the present invention as determined based upon the claims below and any equivalence thereof.

INDUSTRIAL APPLICABILITY

On-highway trucks having manual transmissions 110 are often used to transport payloads over long distances. In certain traffic situations, a driver may desire to downshift into a lower gear to assist with braking or slowing the truck in order to avoid traffic disturbances. By downshifting into a lower gear, the truck is provided with significantly more braking capability which is generated by the drag of the engine.

The method and apparatus 100 of certain embodiments of the present invention, when compared with other methods and apparatus, may have the advantages of permitting the driver to more effectively control the truck, avoiding the need to install additional specialized equipment, avoiding the problems associated with not properly setting conventional equipment and being more economical to use, operate, and maintain. Such advantages are particularly worthy of incorporating into the design, manufacture and operation of on-highway trucks. In addition, the present invention may provide other advantages that have not been discovered yet.

It should be understood that while the preferred embodiment is described in connection with on-highway trucks having a manual transmission coupled to an engine, the present invention is readily adaptable to provide additional braking through controllably shifting to a lower gear of a manual transmission on other vehicles.

Other aspects, objects and advantages of the present invention can be obtained from a study of the drawings, the disclosure and the appended claims.

We claim:

1. An apparatus for controllably shifting into a lower gear of a manual transmission having a primary shift mechanism and downshift speed variable and coupled to an engine having an engine speed, comprising:

a memory adapted to store a maximum downshift limit value;

a secondary shift mechanism adapted to provide a control signal; and a controller in communication with the memory, adapted to receive the control signal, establish a base speed value, set the downshift speed variable equal to the maximum downshift limit value in response to the control signal and the engine speed being greater than or equal to the base speed value and controllably shift the manual transmission into a lower gear in response to the engine speed being less than or equal to the downshift speed variable.

2. The apparatus as set forth in claim 1, wherein the transmission has a top gear and a transmission speed and the controller is adapted to determine whether the transmission is in the top gear before controllably shifting the manual transmission into a lower gear.

3. The apparatus as set forth in claim 1, wherein the controller is adapted to establish a fueling condition corresponding to the movement of the secondary shift mechanism and determine a valid control condition in response to the fueling condition being substantially an idle fueling condition.

4. The apparatus as set forth in claim 3, wherein the engine has an injector duration and the fueling condition is the injector duration.

5. The apparatus as set forth in claim 1, wherein the controller is adapted to establish a fueling condition corresponding to the movement of the secondary shift mechanism and determine a valid control condition in response to the fueling condition being substantially a zero fueling condition.

6. The apparatus as set forth in claim 5, wherein the engine has an injector duration and the fueling condition is the injector duration.

7. The apparatus as set forth in claim 1, including a user interface for providing the maximum downshift limit value.

8. The apparatus as set forth in claim 1, wherein the secondary shift mechanism is adapted to provide a desired engine speed signal having a zero throttle value and corresponding to the movement of the secondary shift mechanism and the controller is adapted to receive the desired engine speed signal, adapted to determine that the control signal was received and adapted to determine a valid control condition in response to the desired engine speed signal being substantially a zero throttle value.

9. The apparatus as set forth in claim 8, wherein the secondary shift mechanism is a fuel pedal having a pulse width modulating sensor adapted to provide the engine speed signal in relation to the movement of the fuel pedal.

10. The apparatus as set forth in claim 1, including at least one solenoid responsive to the controller and adapted to shift the manual transmission into a lower gear.

11. The apparatus as set forth in claim 1, wherein the memory is adapted to store a maximum speed limit value, the transmission has higher gears and the controller is adapted to determine whether the engine speed is greater than or equal to the maximum speed limit value and including at least one solenoid responsive to the controller and adapted to shift the manual transmission into a higher gear in response to the engine speed being greater than or equal to the maximum speed limit value.

12. The apparatus as set forth in claim 1, wherein the secondary shift mechanism is a pushbutton and the controller is adapted to receive the control signal provided by the pushbutton and determine a valid control condition in response to the control signal.

13. A method for controllably shifting into a lower gear of a manual transmission having a downshift speed variable and a secondary shift mechanism and being coupled to an engine having an engine speed, comprising the steps of:

establishing a maximum downshift limit value;

determining a valid control condition in response to the secondary shift mechanism;

determining a base speed value;

setting the downshift speed variable equal to the maximum downshift limit value in response to the engine speed being greater than the base speed value; and controllably shifting the manual transmission into a lower gear in response to the engine speed being less than or equal to the downshift speed variable.

14. The method of claim 13, wherein the engine has a fueling condition corresponding to the movement of the secondary shift mechanism, including the step of:

determining a valid control condition in response to the fueling condition being substantially an idle fueling condition.

15. The method of claim 14, wherein the fueling condition is an injector duration, including the steps of:

monitoring the injector duration and determining a valid control condition in response to the injector duration being substantially an idle injector duration.

16. The method of claim 13, wherein the engine has a fueling condition corresponding to the movement of the secondary shift mechanism, including the step of:

determining a valid control condition in response to the fueling condition being substantially a zero fueling condition.

17. The method of claim 16, wherein the fueling condition is an injector duration, including the steps of:

monitoring the injector duration and determining a valid control condition in response to the injector duration being substantially a zero injector duration.

18. The method of claim 13, wherein the secondary shift mechanism provides a desired engine speed signal having a zero throttle value and corresponding to the movement of the secondary shift mechanism, including the step of:

determining a valid control condition in response to the secondary shift mechanism being in a position to substantially produce the zero throttle value.

19. The method of claim 13, including the step of providing the maximum downshift limit value from a user interface.

20. The method of claim 13, wherein the transmission has a top gear, including the step of:

determining that the transmission is in top gear.

21. The method of claim 20, wherein the transmission has a transmission speed and the step of determining that the transmission is in top gear is determined by using the engine speed to the transmission speed ratio.

22. The method of claim 13, wherein the transmission has higher gears, including the steps of:

establishing a maximum speed limit value;

determining whether the engine speed is greater than or equal to the maximum speed limit value; and shifting the transmission into a higher gear in response to determining whether the engine speed is greater than or equal to the maximum speed limit value.

23. A method for controllably shifting into a lower gear of a manual transmission having a downshift speed variable and coupled to an engine having an engine speed, comprising the steps of:

establishing a maximum downshift limit value;

sensing a control signal and the engine speed;

determining whether a valid control condition exists in response to the control signal;

determining a base speed value;

setting the downshift speed variable equal to the maximum downshift limit value in response to the engine speed being greater than the base speed value; and controllably shifting the manual transmission into a lower gear in response to the engine speed being equal to or less than the downshift speed variable.

24. An apparatus for controllably shifting into a lower gear of a manual transmission having a primary shift mechanism and being coupled to an engine having an engine speed, comprising:
- a memory adapted to store a maximum downshift limit value;
- a secondary shift mechanism adapted to provide a control signal; and
- a controller in communication with the memory and adapted to controllably shift the manual transmission into a lower gear in response to the control signal, the engine speed and the maximum downshift limit value.

25. The apparatus as set forth in claim 24, wherein the transmission has a top gear and a transmission speed and the controller is adapted to determine whether the transmission is in the top gear before controllably shifting the manual transmission into a lower gear.

26. The apparatus as set forth in claim 24, wherein the controller is adapted to establish a fueling condition corresponding to the movement of the secondary shift mechanism and determine a valid control condition in response to the fueling condition being substantially an idle fueling condition.

27. The apparatus as set forth in claim 26, wherein the engine has an injector duration and the fueling condition is the injector duration.

28. The apparatus as set forth in claim 24, wherein the controller is adapted to establish a fueling condition corresponding to the movement of the secondary shift mechanism and determine a valid control condition in response to the fueling condition being substantially a zero fueling condition.

29. The apparatus as set forth in claim 28, wherein the engine has an injector duration and the fueling condition is the injector duration.

30. The apparatus as set forth in claim 24, including a user interface for providing the maximum downshift limit value.

31. The apparatus as set forth in claim 24, including at least one solenoid responsive to the controller and adapted to shift the manual transmission into a lower gear.

32. The apparatus as set forth in claim 24, wherein the secondary shift mechanism is a pushbutton and the controller is adapted to receive the control signal provided by the pushbutton and determine a valid control condition in response to the control signal.

33. A method for controllably shifting into a lower gear of a manual transmission having a secondary shift mechanism and being coupled to an engine having an engine speed, comprising the steps of:
- establishing a maximum downshift limit value;
- determining a valid control condition in response to the secondary shift mechanism; and
- controllably shifting the manual transmission into a lower gear in response to the control signal, the engine speed and the maximum downshift limit value.

34. The method of claim 33, wherein the engine has a fueling condition corresponding to the movement of the secondary shift mechanism, including the step of:
- determining a valid control condition in response to the fueling condition being substantially an idle fueling condition.

35. The method of claim 33, wherein the engine has a fueling condition corresponding to the movement of the secondary shift mechanism, including the step of:
- determining a valid control condition in response to the fueling condition being substantially a zero fueling condition.

36. The method of claim 33, wherein the secondary shift mechanism provides a desired engine speed signal having a zero throttle value and corresponding to the movement of the secondary shift mechanism, including the step of:
- determining a valid control condition in response to the secondary shift mechanism being in a position to substantially produce the zero throttle value.

37. The method of claim 33, including the step of providing the maximum downshift limit value from a user interface.

38. The method of claim 33, wherein the transmission has a top gear, including the step of:
- determining that the transmission is in top gear.

39. The method of claim 33, wherein the transmission has higher gears, including the steps of:
- establishing a maximum speed limit value;
- determining whether the engine speed is greater than or equal to the maximum speed limit value; and
- shifting the transmission into a higher gear in response to determining whether the engine speed is greater than or equal to the maximum speed limit value.

* * * * *